United States Patent
Rajput et al.

(10) Patent No.: US 10,803,188 B1
(45) Date of Patent: Oct. 13, 2020

(54) SYSTEMS AND METHODS FOR PREVENTING SENSITIVE DATA SHARING

(71) Applicant: Symantec Corporation, Mountain View, CA (US)

(72) Inventors: Pallavi Rajput, Wakad (IN); Anand Darak, Dhayari (IN); Anuradha Joshi, Bibwewadi (IN)

(73) Assignee: NortonLifeLock, Inc., Tempe, AZ (US)

( * ) Notice: Subject to any disclaimer, the term of this patent is extended or adjusted under 35 U.S.C. 154(b) by 186 days.

(21) Appl. No.: 16/018,035

(22) Filed: Jun. 25, 2018

(51) Int. Cl.
  *G06F 21/62* (2013.01)
  *H04L 12/58* (2006.01)
  *G06F 21/56* (2013.01)

(52) U.S. Cl.
  CPC .............. *G06F 21/62* (2013.01); *G06F 21/56* (2013.01); *H04L 51/12* (2013.01); *H04L 51/32* (2013.01)

(58) Field of Classification Search
  CPC ... H04L 9/3273; H04L 9/0866; H04L 9/3278; H04L 9/0662; H04L 2209/84; H04L 2209/80; H04L 9/0869; H04L 9/3247; H04L 51/12; H04L 51/32; G06F 7/588; G06F 21/62; G06F 21/56; G07C 9/00857; G07C 9/00309; H04B 1/59
  See application file for complete search history.

(56) References Cited

U.S. PATENT DOCUMENTS

| | | | | |
|---|---|---|---|---|
| 8,769,613 B2 * | 7/2014 | Latchem | ............ | G06F 21/6245 726/27 |
| 9,519,794 B2 * | 12/2016 | Fox | ....... | G06F 21/6245 |
| 9,609,025 B1 * | 3/2017 | Betzler | ................... | H04L 63/20 |
| 10,032,046 B1 * | 7/2018 | Hayashi | .............. | G06F 21/6227 |
| 10,382,620 B1 * | 8/2019 | Allen | ................ | H04M 1/72577 |
| 2006/0101334 A1 * | 5/2006 | Liao | ........................ | G06F 21/606 715/205 |
| 2007/0016914 A1 * | 1/2007 | Yeap | ..................... | G06F 21/554 719/328 |
| 2009/0241197 A1 * | 9/2009 | Troyansky | ............ | H04L 63/145 726/26 |
| 2010/0251369 A1 * | 9/2010 | Grant | .................... | G06F 21/554 726/23 |
| 2012/0324094 A1 * | 12/2012 | Wyatt | ................. | H04L 43/0876 709/224 |
| 2013/0086681 A1 * | 4/2013 | Jaroch | ................... | G06F 21/566 726/23 |
| 2014/0208445 A1 * | 7/2014 | DeLuca | ............. | H04L 63/0428 726/30 |
| 2015/0007265 A1 * | 1/2015 | Aissi | ...................... | G06F 21/60 726/3 |

(Continued)

*Primary Examiner* — Darren B Schwartz
(74) *Attorney, Agent, or Firm* — FisherBroyles, LLP

(57) ABSTRACT

The disclosed computer-implemented method for preventing sensitive data sharing may include a computing device determining that a content item is to be shared with an application. The content idem may be intercepted before the content item is shared with the application. The data of the content item may be analyzed. In response to analyzing the data of the content item, a security action may be performed to protect the computing device from computer malware or prevent sharing of sensitive data of the computing device. Various other methods, systems, and computer-readable media are also disclosed.

17 Claims, 6 Drawing Sheets

(56) References Cited

U.S. PATENT DOCUMENTS

| | | | | |
|---|---|---|---|---|
| 2015/0186641 | A1* | 7/2015 | Cabrera | G06F 21/554 |
| | | | | 726/23 |
| 2015/0215327 | A1* | 7/2015 | Cabrera | H04L 63/1416 |
| | | | | 726/23 |
| 2015/0341385 | A1* | 11/2015 | Sivan | H04L 63/1466 |
| | | | | 726/23 |
| 2015/0379287 | A1* | 12/2015 | Mathur | G06F 21/6209 |
| | | | | 726/27 |
| 2016/0117495 | A1* | 4/2016 | Li | G06F 21/31 |
| | | | | 726/1 |
| 2017/0093787 | A1* | 3/2017 | Harihara Iyer | H04L 51/12 |
| 2018/0218163 | A1* | 8/2018 | Ananthapur Bache | |
| | | | | G06F 21/6209 |
| 2019/0318089 | A1* | 10/2019 | Wang | G06F 21/56 |
| 2019/0325131 | A1* | 10/2019 | Prayaga | G06F 9/44521 |

\* cited by examiner

SYSTEMS AND METHODS FOR PREVENTING SENSITIVE DATA SHARING

BACKGROUND

In many enterprise and consumer environments, users of computing devices (e.g., mobile computing devices) may wish to share displayed selected content from their devices with others, such as through social media or email applications. Unfortunately, the sharing of content from computing devices presents several drawbacks, such as the risk of sharing malicious information and/or sensitive data. In one example of sharing malicious information, the content item to be shared by a computing device may be associated with a malicious link or file, which may be shared with the content item. The user sharing the content item may not be aware of the malicious information associated with and being shared with the content item. For example, the content item to be shared may contain hacked peer contact details from a previous malicious attack. Another example may include a fake message which is forwarded from the computing device to contacts of the computing device. The fake message may include a malicious link which may potentially infect the receiving computing device. In another instance, an application package kit being shared over a wireless protocol, such as Bluetooth, may include malicious code that could infect the receiving computing device.

In some instances, sharing content via social media or email applications may result in sharing sensitive data, such as a location of a photo, personally identifying information, or the like. Some applications have pre-filled templates that may be used to share content items through social media or email. However, the templates may contain user sensitive information. Users may not have insight into the information being shared. For example, a sharing intent of an application may contain data, such as files or contact information, which the user may not be aware of prior to sharing the content item. In one example, a user may utilize a fitness application to share a recent fitness level achieved. However, additional information, such as photos, videos, or a current location of the computing device may be unintentionally shared. The instant disclosure, therefore, identifies and addresses a need for systems and methods for preventing sensitive data sharing.

SUMMARY

As will be described in greater detail below, the instant disclosure describes various systems and methods for preventing sensitive data sharing. In one example, a method for preventing sensitive data sharing may include [(i) determining, by the computing device, that a content item is to be shared with an application, (ii) intercepting the content item before the content item is shared with the application, (iii) analyzing data of the content item, and (iv) in response to analyzing the data of the content item, performing a security action to protect the computing device from computer malware or prevent sharing of sensitive data of the computing device.]

In one example, determining that the content item is to be shared with the application may include detecting that a system level messaging intent has been triggered. The application may be a social network application. The content item may include at least one of a photograph, a graphic, an audio recording, text, a file, or a website link. In some examples, analyzing the data of the content item may include determining that the content item includes sensitive information associated with the computing device or a user of the computing device. The method may include (i) displaying an alert identifying the sensitive information, (ii) receiving an indication to execute the security action, and (iii) in response to receiving the indication, performing the security action. The security action may include at least one of blocking sharing the sensitive information with the application, permitting sharing the sensitive information with the application, and editing the sensitive information and sharing the edited sensitive information with the application.

In some examples, analyzing the data of the content item may include determining that the content item includes malicious information. The security action may include at least one of deleting the content item or deleting the malicious information before sharing the content item with the application.

In one example, a system for preventing sensitive data sharing may include a computing device comprising at least one physical processor and physical memory comprising computer-executable instructions. Executing the computer-executable instructions may cause the computing device to (i) determine that a content item is to be shared with an application, (ii) intercept the content item before the content item is shared with the application, (iii) analyze data of the content item, and (iv) in response to analyzing the data of the content item, perform a security action to protect the computing device from computer malware or prevent sharing of sensitive data of the computing device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that a content item is to be shared with an application, (ii) intercept the content item before the content item is shared with the application, (iii) analyze data of the content item, and (iv) in response to analyzing the data of the content item, perform a security action to protect the computing device from computer malware or prevent sharing of sensitive data of the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
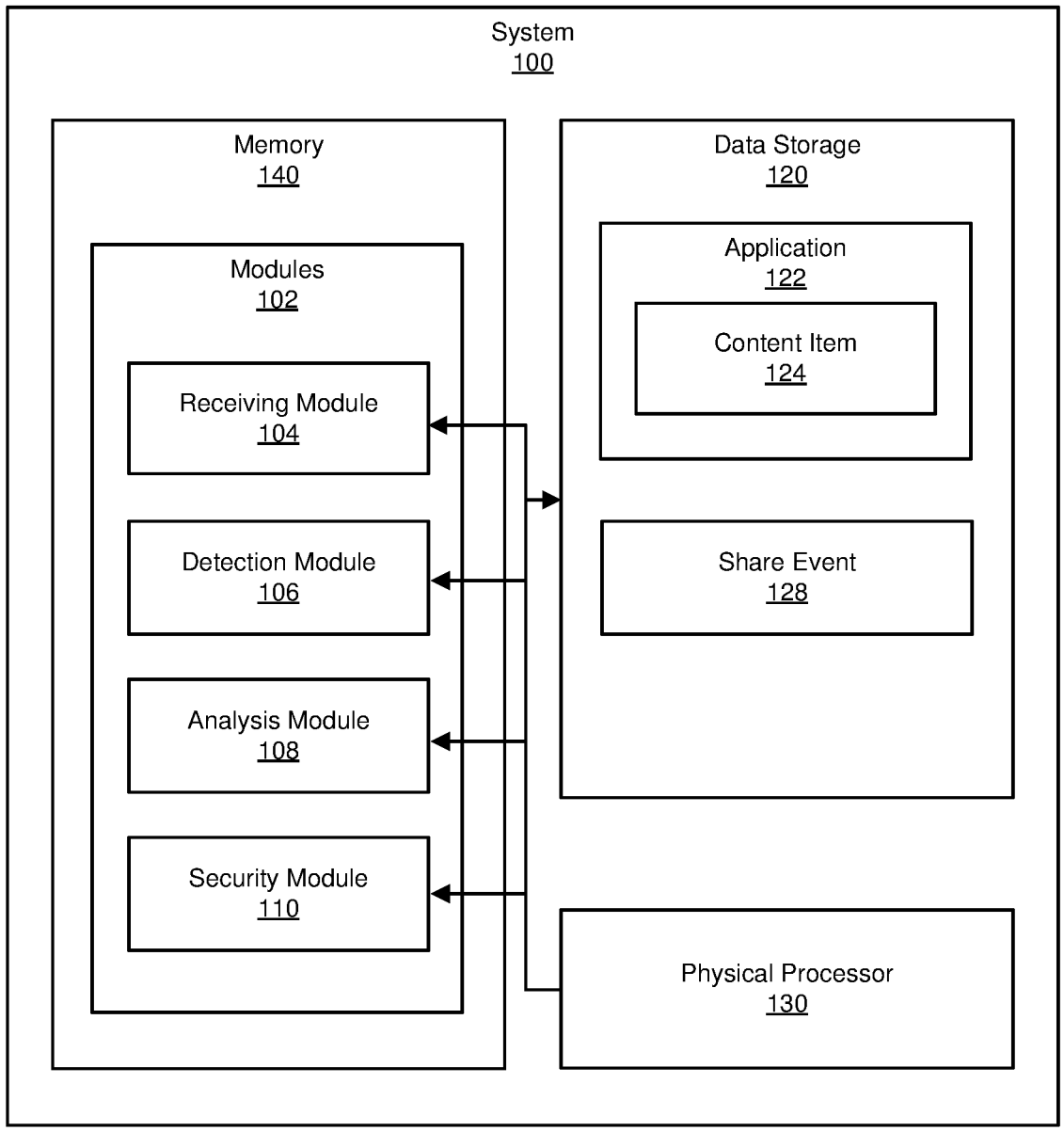
FIG. 1 is a block diagram of an example system for preventing sensitive data sharing.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing sensitive data sharing. As will be explained in greater detail below, by intercepting and analyzing content before it is shared with an application, which may be used to share the content with other users (e.g., social media applications, email application, etc.), the systems and methods described herein may be able to perform a security action to protect the computing device from sharing malicious data or sensitive data with other computing devices.

In addition, the systems and methods described herein may improve the functioning of a computing device and/or the technical field of computer device security, by preventing the unintentional sharing of sensitive or personal information and/or preventing potentially malicious activity that may compromise the operation of the computing device. For example, the systems and methods described herein may prevent a computing device from sharing photos, videos, location, or the like, unbeknownst to the user. The systems and methods may also prevent the computing device from sharing, unknown to the user, email messages intended to install malware for damaging or disabling a receiving computing device.

Figure 2:
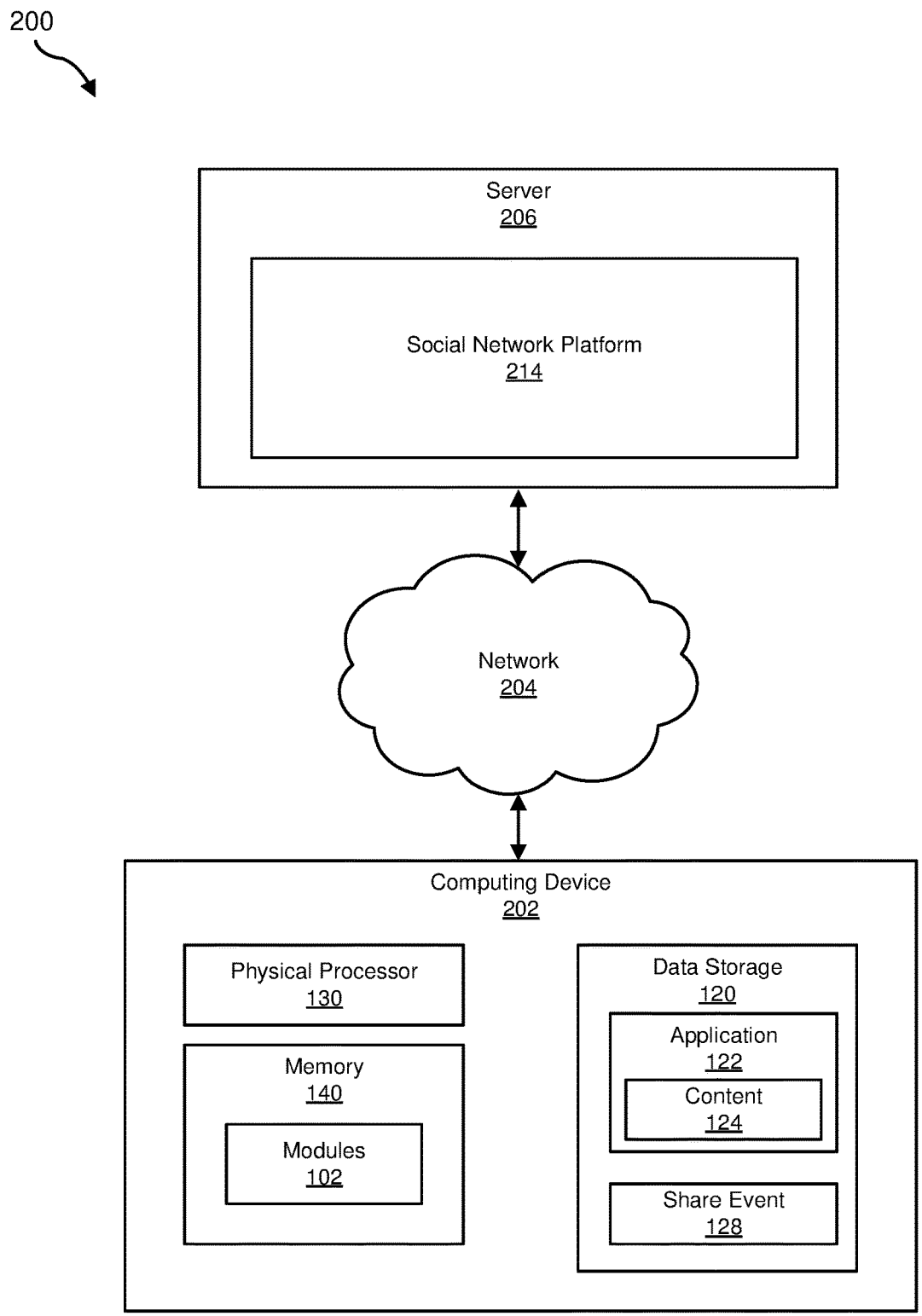
FIG. 2 is a block diagram of an additional example system for preventing sensitive data sharing.

The following will provide, with reference to FIGS. 1-2, detailed descriptions of example systems for preventing sensitive data sharing. Detailed descriptions of corresponding computer-implemented methods will also be provided in connection with FIG. 3. A detailed description of an example user interface that may be generated by the example system for preventing sensitive information sharing on a computing device, will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for preventing sensitive data sharing. As illustrated in this figure, example system 100 may include one or more modules 102 for performing one or more tasks. As will be explained in greater detail below, modules 102 may include a receiving module 104 that may receive a selection of a content item 124 to be shared with an application 122, a detection module 106 that may detect a share event 128 in response to an action by the user to share the content item 124 with the application 122, and a security module 110 that may perform a security action to protect the computing device from potentially malicious activity associated with the share event 128. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing sensitive data sharing. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include data storage 120. Data storage 120 generally represents any type or form of computing device capable of data storage. In one example, data storage 120 may store application 122, content item(s) 124, and share event(s) 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to preventing sensitive data sharing. For example, and as will be described in greater detail below, one or more of modules 102 may cause computing device 202 and/or server 206 to (1) determine, by a detection module 106, that a content item 124 is to be shared with an application 122, (2) intercept, by the detection module 106, the content item 124 (e.g., associated with a share event 128) before the content item 124 is shared with the application 122, (3) analyze, by the analysis module 108, data of the content item

124 to determine if the content item includes or is associated with sensitive data or malware, and (4) in response to analyzing the data of the content item, performing, by the security module 110, a security action to protect the computing device from computer malware, prevent sharing malware, or prevent sharing of sensitive data of the computing device.

Computing device 202 generally represents any type or form of computing device capable of reading computer-executable instructions. For example, computing device 202 may include an endpoint device (e.g., a mobile computing device) running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In one example, server 206 may be a social network server hosting a social network platform 214 to facilitate content sharing among users. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
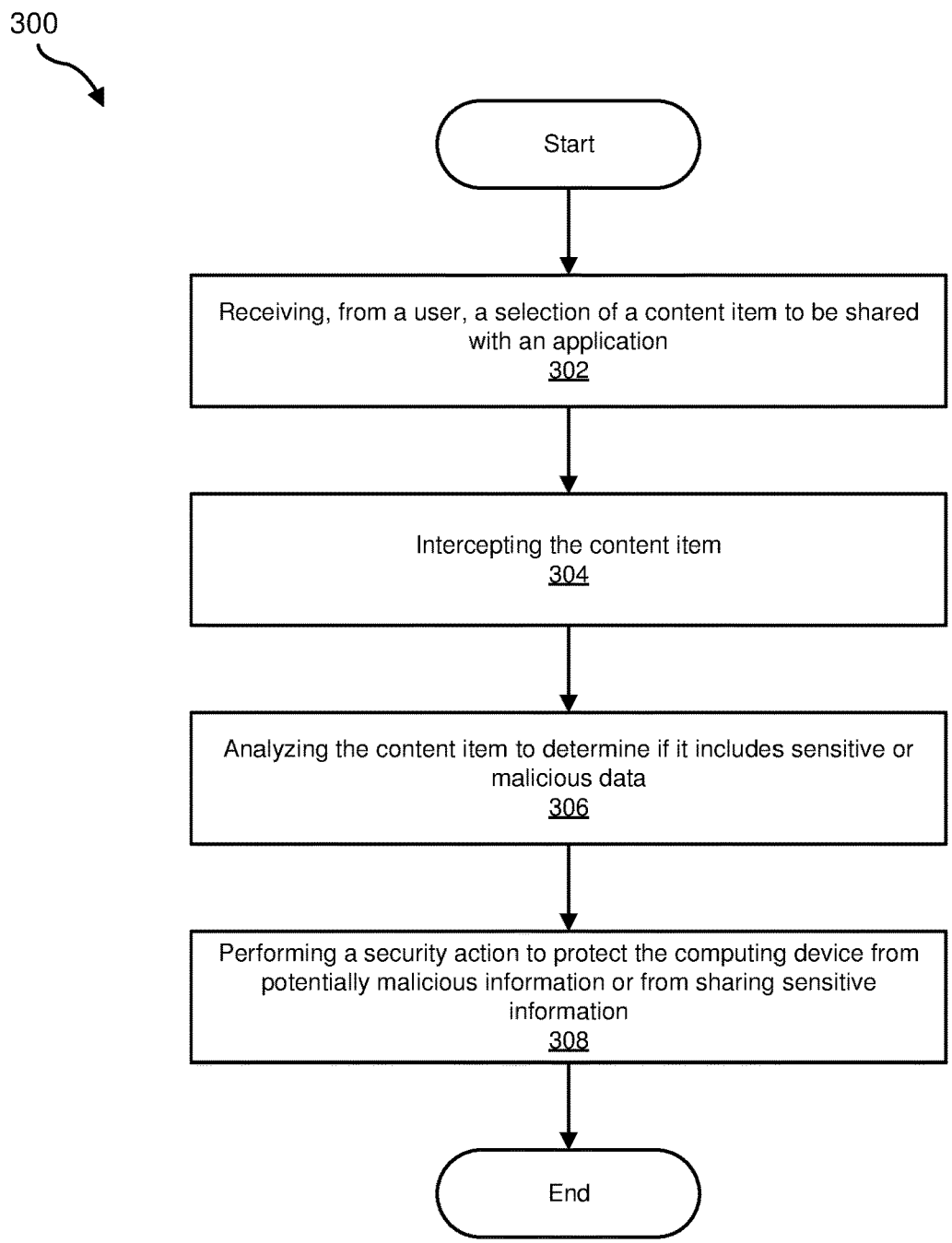
FIG. 3 is a flow diagram of an example method for preventing sensitive data sharing.

FIG. 3 is a flow diagram of an example computer-implemented method 300 for preventing sensitive data sharing. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive content and receive a selection from a user of a content item 124 from the content to be shared with an application 122. For example, receiving module 104 may, as part of computing device 202 in FIG. 2, receive an indication from a user to share a content item 124 with an application 122.

The term "content item," as used herein, generally refers to content generated by and/or stored on a computing device that is selected by a user to share with an application 122 on a user's computing device. For example, a content item 124 may include, but is not limited to, a photograph, a graphic, an audio recording, text, a file, or a website link. Content may be shared through an application 122, such a social network application or an email application. In some examples, data may be associated and stored with the content item 124, such as metadata. The data may include sensitive data, such as personally identifying information. Examples of personally identifying information may include names, addresses, email addresses, identification number (e.g., passport number, driver's license number, social security number, etc.), vehicle registration number, credit card numbers, fingerprints, birthdate, telephone number, usernames, and the like. In some examples, the data may include malware or malicious data that may corrupt or otherwise harm a computing device.

The systems described herein may perform step 302 in a variety of ways. In one example, receiving module 104 may receive content in a variety of ways. In one example, receiving module 104 may receive the selection of content item 124 by a user to be shared with application 122. For example, the user, using application 122 (e.g., an email application) on computing device 202, may select content item 124 by opening an email message and selecting the content item 124 to attach to the message.

At step 304, one or more of the systems described herein may intercept the content item 124. For example, detection module 106 may, as part of system 200 in FIG. 2, determine that a share event 128 has been triggered. In some examples, the share event 128 may be a system level messaging intent triggered by the application 122 in response to a user action to share a content item 124. Detection module 106 may intercept and extract the content item 124 from the system level messaging intent.

The systems described herein may perform step 304 in any suitable manner. For example, detection module 106 may intercept the share event 128 and may extract the content item 124. For example, detection module 106 may scan the share event 128 to determine if a content item 124 is associated with the share event 128. The detection module 106 may extract the content item 124 from the share event 128 or obtain the content item 124 from a location indicated by the share event 128. If there is no content item 124, the method may terminate. If a content item 124 is associated with the share event 128, the method may proceed to step 306.

The term "share event," as used herein, generally refers to an action (e.g., a service event) detected by a software service configured to monitor one or more applications executing on a computing device. For example, a share event 128 may include a system level messaging intent, which may be intercepted and the contents of which may be analyzed to detect if there is any data associated with or contained within the content item 124 that may be sensitive or malicious.

At step 306, one or more of the systems described herein may analyze the content item 124 to determine if it includes sensitive or malicious data. For example, analysis module 108 may, as part of system 200 in FIG. 2, scan the content item 124 has any associated data (e.g., metadata) or includes any subcomponents or fields. In some examples, the content item 124 may be included in a template associated with the application 122. The template may be used by the application 122 to share data. The template may include pre-filled fields which may contain sensitive information, such as personally identifying information. The user may be unaware that the sensitive information has been added to the template and thus shared by the application 122 when sharing the content item 124.

The systems described herein may perform step 306 in any suitable manner. For example, analysis module 108 may scan the content item 124 to identify any potentially sensitive information or malicious information. For example, analysis module 108 may scan, using known techniques for detecting similar data (e.g., machine learning, pattern matching, etc.) the content item 124 and compare any text to known personally identifying information associated with the user of the computing device. The analysis module 108 may also scan the content item 124 and compare the content item 124 and any of its components to a known list of malware to identify any potential malware that may be stored within or in conjunction with the content item 124. The analysis module 108 may determine that the content item 124 is associated with sensitive information or malware and may proceed to step 308.

At step 308, one or more of the systems described herein may perform a security action to protect the computing device from potentially malicious information or from sharing sensitive information. For example, security module 110 may, as part of system 200 in FIG. 2, receive from analysis module 108 that the content item 124 is associated with potentially sensitive information or potential malware. In some examples, the security module 110 may perform an action, such as blocking the application 122 from sharing the content item 124.

The systems described herein may perform step 308 in any suitable manner. For example, security module 110 may determine that the content item 124 is associated with potentially sensitive information. The security module 110 may generate an alert and display the alert to the user of the computing device. In some examples, the alert may include one or more actions to take in response to detecting the sensitive information. The user may select one of the presented actions displayed through a user interface displaying the alert. The security module 110 may receive an indication to execute the selected security action. In response to receiving the indication, the security module 110 may perform the security action. The security action may include blocking sharing the sensitive information with the application, permitting sharing the sensitive information with the application, or editing the sensitive information and sharing edited sensitive information with the application.

In some examples, the analysis module 108 may have determined that the content item 124 is associated with malicious information (e.g., potential malware). The security module 110 may execute a security action in response to the determination that the information is malicious. The security action may include deleting the content item or deleting the malicious information before sharing the content item with the application. In some examples, the security action may be performed in response to receiving an indication from the user based on an alert that was displayed notifying the user of the potential malware. In some examples, the security action may be performed based on rules or user history indicative of previous security actions taken in response to detected potential malware.

Figure 4:
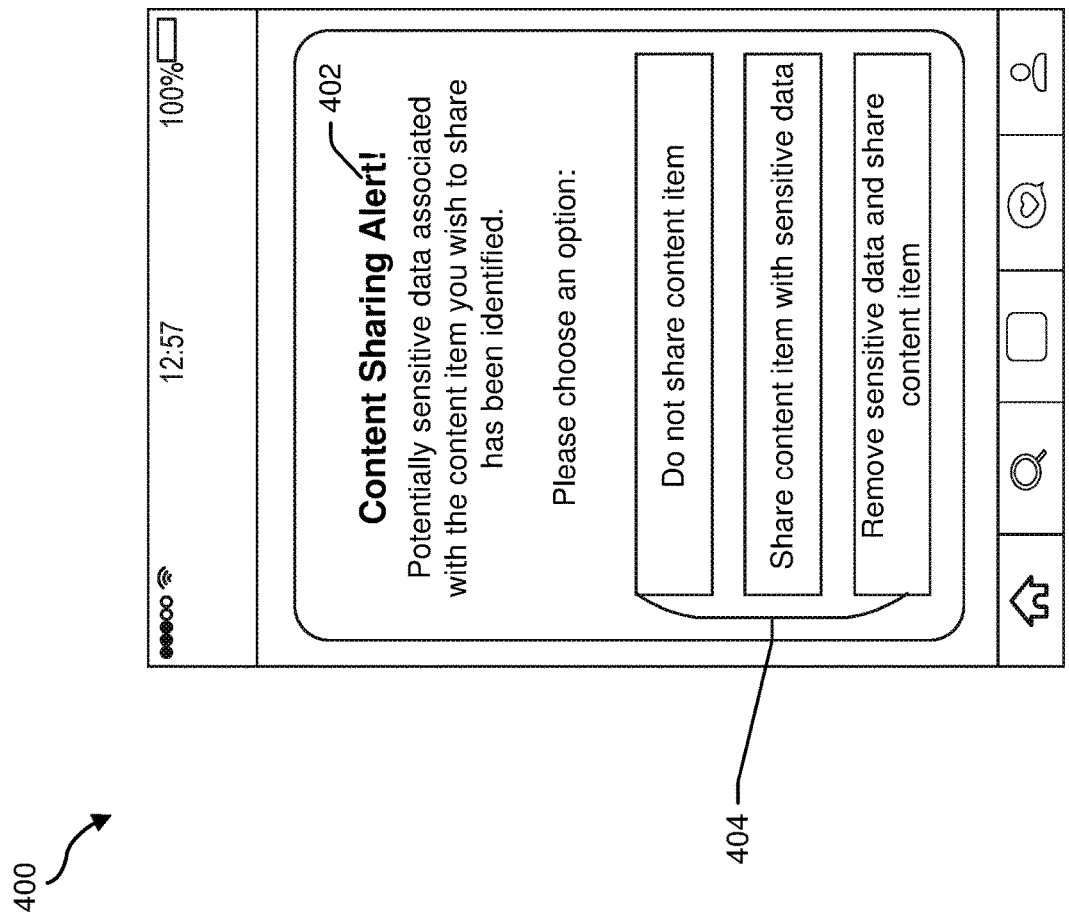
FIG. 4 is a block diagram of an example user interface that may be generated by the example system for preventing sensitive data sharing.

FIG. 4 is a block diagram of an example user interface 400 that may be generated by the example system for preventing sensitive data sharing. In one example, user interface 400 may be generated by security module 110 as part of computing device 202. The user interface 400 may include an alert 402 that notifies the user that potentially sensitive data is associated with the content item 124 the user wishes to share. The user interface 400 may include multiple actions 404 the user may select in response to the detection of sensitive data. Examples of the actions 404 may include not sharing the content item, sharing the content item with the sensitive data, or removing the sensitive data and sharing the content item 124.

As described in connection with method 300 above, the systems and methods described herein may prevent sensitive or malicious data sharing on a computing device. In some examples, the systems described herein may be embedded into a mobile device operating system (such as the ANDROID mobile operating system). Once the systems described herein determines that a content item is to be shared by a user (e.g., via a social media application or email application) with other users, the systems described herein may scan the content item and determine whether the content item contains any sensitive data (e.g., location, photographs, videos, etc.) or malicious data (e.g., fake message with malicious link, hacked peer contact details, etc.). The systems described herein may then listen for a sharing event to detect any content items that are to be shared. The systems described herein may then determine whether the content item contains any vulnerable information and alert the user. The user may be presented with different security actions, such as blocking the content from being shared, modifying the content prior to sharing, or sharing the content without any further action.

Figure 5:
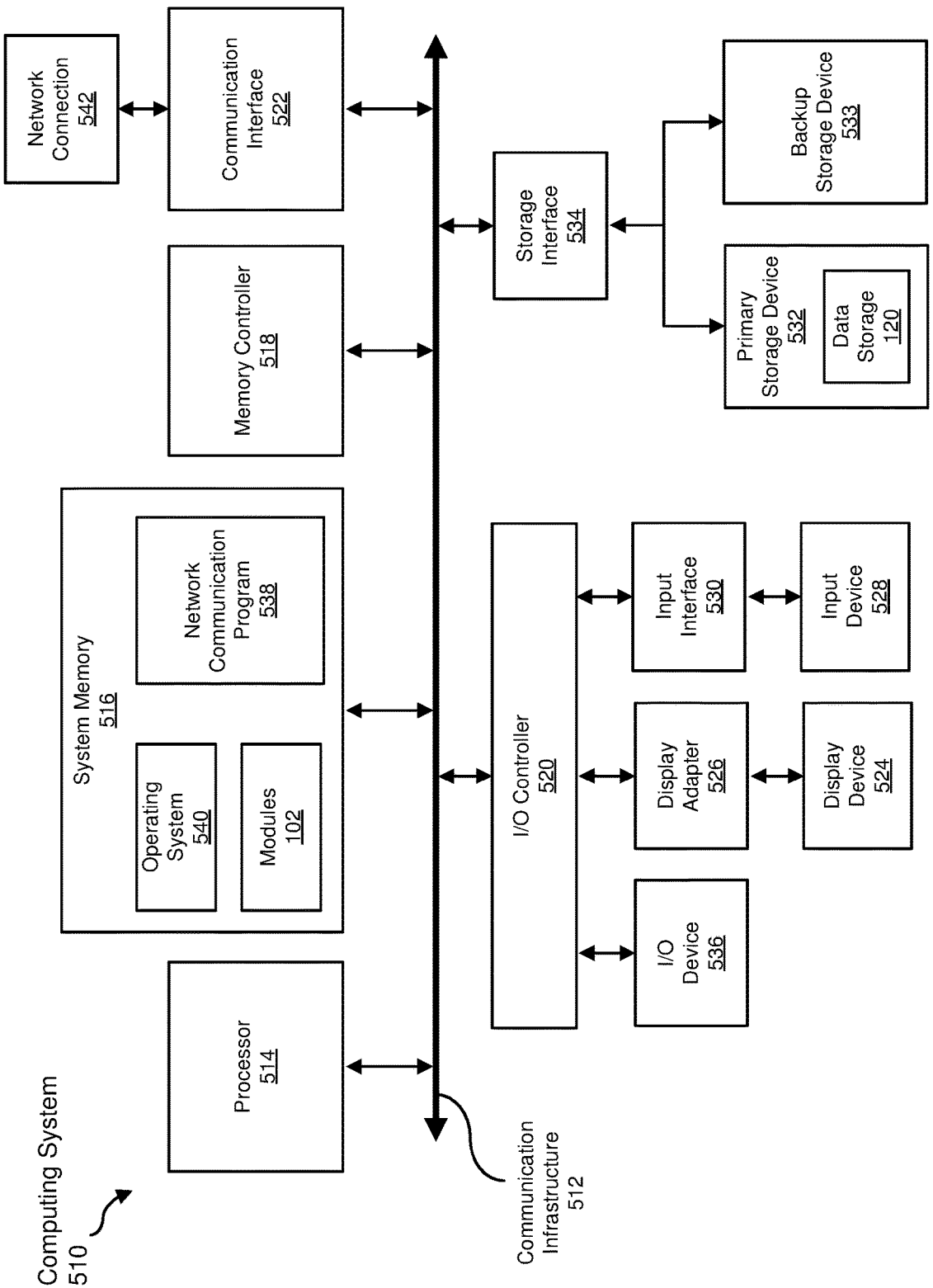
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536.

In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, one or more applications 122 and one or more content items 134 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
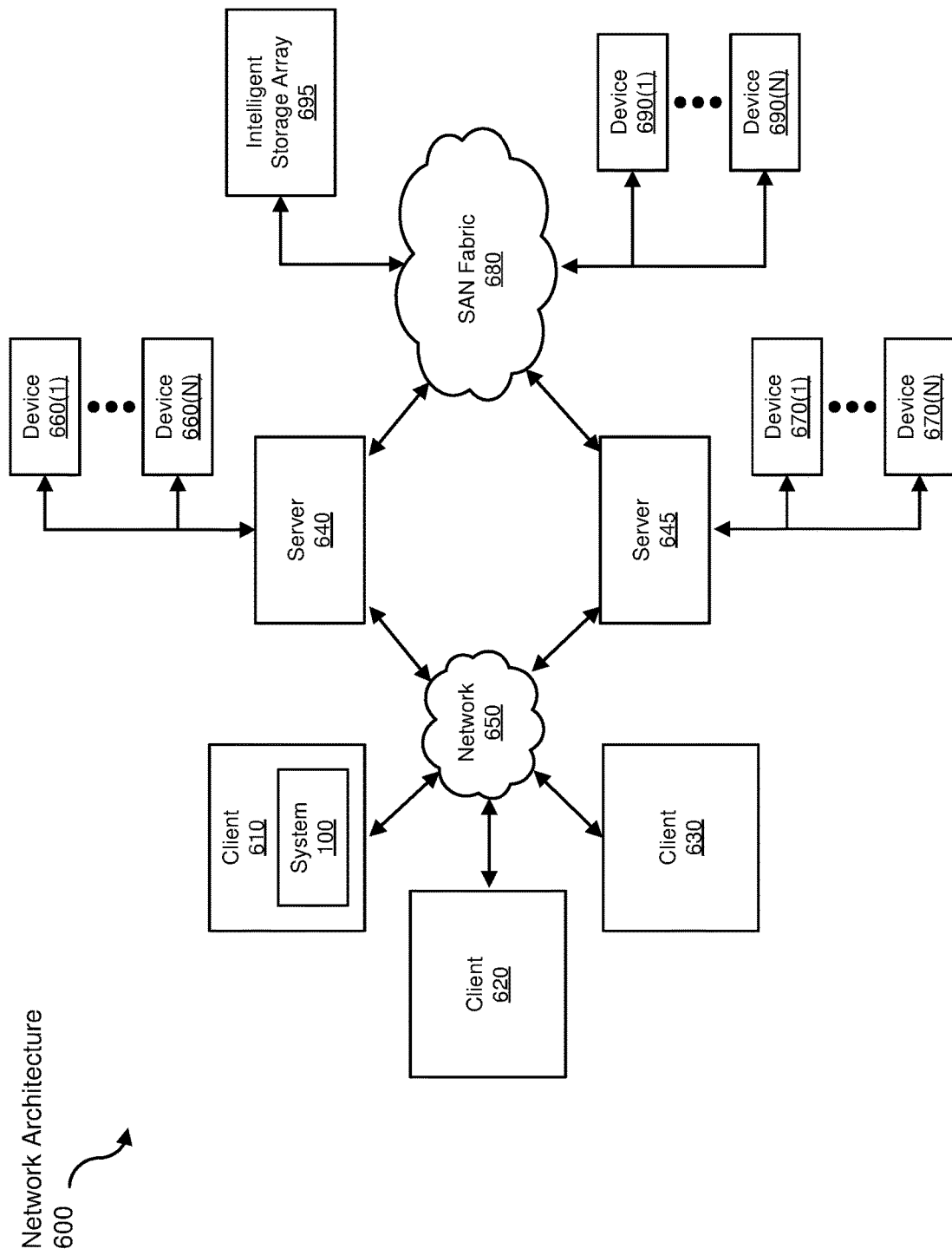
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for preventing sensitive data sharing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing sensitive data sharing, at least a portion of the method being performed by a computing device comprising at least one processor, the method comprising:
   determining, by the computing device, that a content item is to be shared with an application by detecting that a share event corresponding to a system level messaging intent has been triggered;
   intercepting the content item before the content item is shared with the application by intercepting the share event and extracting the content item from the system level messaging intent;
   analyzing data of the content item, wherein analyzing data of the content item comprises determining that the content item comprises sensitive information associated with the computing device or a user of the computing device; and
   in response to determining that the content item comprises sensitive information, displaying to a user attempting to share the sensitive information:
      (a) an alert identifying the sensitive information; and
      (b) a prompt to select one of two or more security actions;
   receiving, from the user attempting to share the sensitive information, an indication to execute a selected one of the two or more security actions; and
   in response to receiving the indication, performing the selected one of the two or more security actions.

2. The computer-implemented method of claim 1, wherein the application is a social network application.

3. The computer-implemented method of claim 1, wherein the content item comprises at least one of:
   a photograph,
   a graphic,
   an audio recording,
   text,
   a file, or
   a website link.

4. The computer-implemented method of claim 1, wherein the content item comprises sensitive information associated with the computing device or a user of the computing device.

5. The computer-implemented method of claim 1, wherein the two or more security actions include at least two of:
   blocking sharing the sensitive information with the application;
   permitting sharing the sensitive information with the application; or
   editing the sensitive information and sharing edited sensitive information with the application.

6. The computer-implemented method of claim 1, wherein the selected one of the two or more security actions comprises one of:
   blocking sharing the sensitive information with the application;
   permitting sharing the sensitive information with the application; or
   editing the sensitive information and sharing edited sensitive information with the application.

7. The computer-implemented method of claim 1, wherein analyzing data of the content item comprises:
   determining that the content item comprises malicious information.

8. The computer-implemented method of claim 7, wherein the selected one of the two or more security actions comprises at least one of:
   deleting the content item; or
   deleting the malicious information before sharing the content item with the application.

9. A system for preventing sensitive data sharing, the system comprising:
   a computing device comprising at least one physical processor; and
   physical memory comprising computer-executable instructions that, when executed by the at least one physical processor, cause the computing device to:
      determine that a content item is to be shared with an application by detecting that a share event corresponding to a system level messaging intent has been triggered;

intercept the content item before the content item is shared with the application by intercepting the share event and extracting the content item from the system level messaging intent;

analyze data of the content item, including determining that the content item comprises sensitive information associated with the computing device or a user of the computing device; and in response to determining that the content item comprises sensitive information, display to a user attempting to share the sensitive information:

(a) an alert identifying the sensitive information; and (b) a prompt to select one of two or more security actions;

receive, from the user attempting to share the sensitive information, an indication to execute a selected one of the two or more security actions; and in response to receiving the indication, perform the selected one of the two or more security actions.

10. The system of claim 9, wherein the application is a social network application.

11. The system of claim 9, wherein the content item comprises at least one of:
a photograph,
a graphic,
an audio recording,
text,
a file, or
a website link.

12. The system of claim 9, wherein the content item comprises sensitive information associated with the computing device or a user of the computing device.

13. The system of claim 9, wherein the two or more security actions comprise at least two of:
blocking sharing the sensitive information with the application;
permitting sharing the sensitive information with the application; or
editing the sensitive information and sharing edited sensitive information with the application.

14. The system of claim 9, wherein the selected one of the two or more security actions comprises at least one of:
blocking sharing the sensitive information with the application;
permitting sharing the sensitive information with the application; or
editing the sensitive information and sharing edited sensitive information with the application.

15. The system of claim 9, wherein, to analyze the data of the content item, the computer-executable instructions further cause the computing device to:
determine that the content item comprises malicious information.

16. The system of claim 15, wherein the selected one of the two or more security actions comprises at least one of:
deleting the content item; or
deleting the malicious information before sharing the content item with the application.

17. A non-transitory computer-readable medium comprising one or more computer-executable instructions that, when executed by at least one processor of a computing device, cause the computing device to:

determine that a content item is to be shared with an application by detecting that a share event corresponding to a system level messaging intent has been triggered;

intercept the content item before the content item is shared with the application by intercepting the share event and extracting the content item from the system level messaging intent;

analyze data of the content item, including determining that the content item comprises sensitive information associated with the computing device or a user of the computing device; and in response to determining that the content item comprises sensitive information, display to a user attempting to share the sensitive information:

(a) an alert identifying the sensitive information; and (b) a prompt to select one of two or more security actions;

receive, from the user attempting to share the sensitive information, an indication to execute a selected one of the two or more security actions; and in response to receiving the indication, perform the selected one of the two or more security actions.

\* \* \* \* \*

UNITED STATES PATENT AND TRADEMARK OFFICE
CERTIFICATE OF CORRECTION

PATENT NO.       : 10,803,188 B1
APPLICATION NO.  : 16/018035
DATED            : October 13, 2020
INVENTOR(S)      : Pallavi Rajput, Anand Darak and Anuradha Joshi Page 1 of 1

It is certified that error appears in the above-identified patent and that said Letters Patent is hereby corrected as shown below:

On the Title Page

Assignee's name should read - NortonLifeLock Inc.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*